(12) United States Patent
Lacombe et al.

(10) Patent No.: US 6,466,388 B1
(45) Date of Patent: Oct. 15, 2002

(54) OVERSHOOT CONTROL FOR VOLTAGE SOURCE/IMPEDANCED BASED WRITE COIL DRIVER

(75) Inventors: David K. Lacombe, Mission Viejo; Chii-Fa Chiou, Lake Forest, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/715,625

(22) Filed: Nov. 17, 2000

(51) Int. Cl.[7] ................................................. G11B 5/02
(52) U.S. Cl. .......................................... 360/68; 327/110
(58) Field of Search .............................. 360/68, 67, 46; 327/108, 110, 494, 495, 497

(56) References Cited

U.S. PATENT DOCUMENTS 6,121,800 A * 9/2000 Leighton et al. ............ 327/110
6,181,496 B1 * 1/2001 Price, Jr. ...................... 360/46

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

The present invention achieves technical advantages as an overshoot circuit (30) for a voltage source/impedance based write coil driver circuit (10) accurately controlling the current ($I_W$) through a coil ($L_H$) that is used to write data to a magnetic medium. The circuit (30) improves the characteristics of the coil.

15 Claims, 4 Drawing Sheets

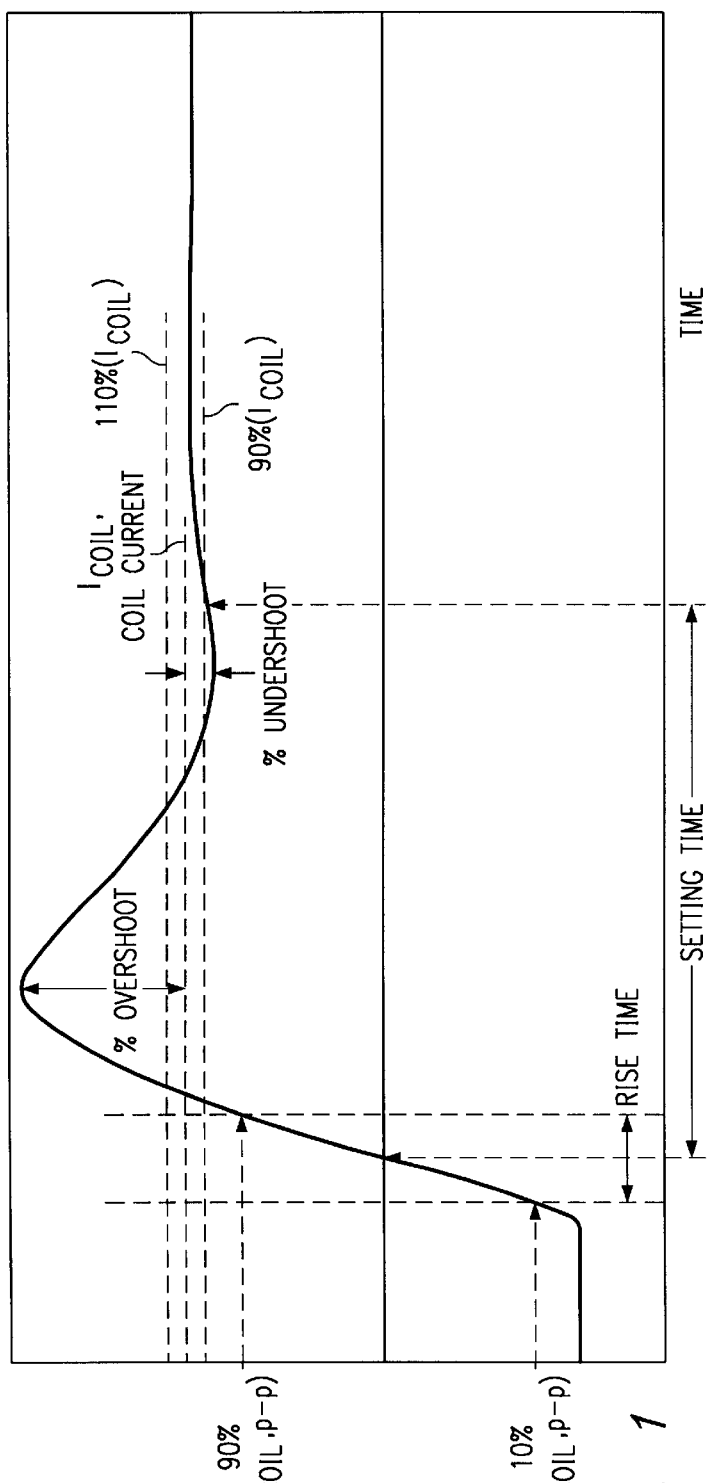
FIG. 1
FIG. 7
FIG. 6

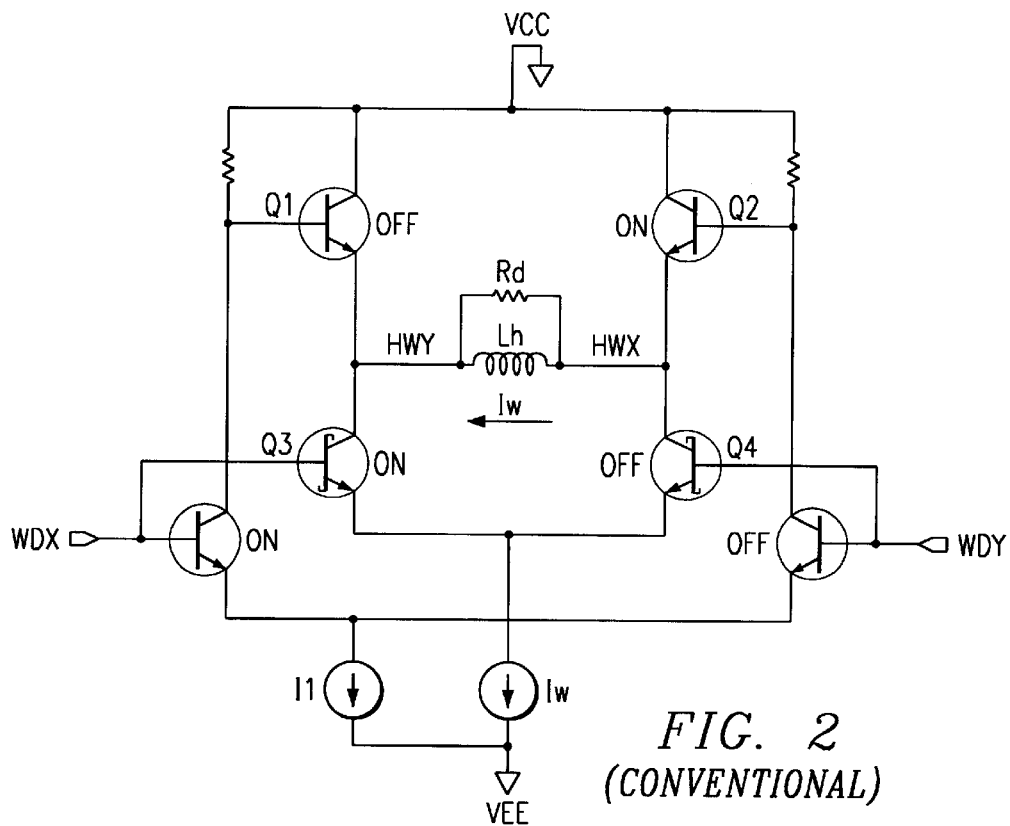
FIG. 2
*(CONVENTIONAL)*

OVERSHOOT CONTROL FOR VOLTAGE SOURCE/IMPEDANCED BASED WRITE COIL DRIVER

CROSS REFERENCE TO RELATED APPLICATIONS

Cross reference is made to commonly assigned co-pending patent application Ser. No. 09/715,599 entitled "Voltage Source/impedance Based Write Coil Driver" filed herewith, the teachings of which are incorporated herein by reference.

FIELD OF THE INVENTION

The present invention is generally related to mass media drive controllers, and more particularly to a Overshoot Control for Voltage Source/Impedance Based Write Coil Driver.

BACKGROUND OF THE INVENTION

The current characteristics that are important are shown in FIG. 1. In particular, the current's rise time, overshoot, undershoot, and settling time are of interest. The desired characteristics for the coil current are a fast rise time and settling time, a controllable amount of overshoot, and very little undershoot. By achieving these current characteristics, a hard disk drive's storage capacity can be improved.

A conventional current source based write coil driver is shown in FIG. 2. The coil is modeled has $L_H$ and $R_D$, and is connected to four transistors via node HWY and HWX. The connection of the four transistors is known as an H-bridge. The H-bridge controls the direction of the coil current $I_W$. A change in the direction of the write coil current creates magnetic flux changes through the coil.

The impedance seen at nodes HWX and HWY is different. If current is flowing through the coil from HWX to HWY, the impedance at HWX is low, and the impedance at HWY is very high. There are two significant problems with this conventional circuit: (1) the common mode impedance between HWX and HWY is not the same; (2) the differential impedance between HWY and HWX cannot be matched to a transmission lines characteristic impedance.

Because of these problems, the coil current will ring and will be distorted by load reflections at HWX, HWY. The coil current distortion could lead to slow risetime, unpredictable current overshoot, longer settling time, and ringing.

The new voltage source/impedance based writer has a similar common mode impedance on nodes HWX, and HWY. Also, the differential impedance between HWX and HWY can match the transmission line impedance that connects the writer to the coil. This architecture achieves the desired write current characteristics.

SUMMARY OF THE INVENTION

The present invention achieves technical advantages as an overshoot circuit for the voltage source/impedance based write coil driver accurately controlling the current through a coil that is used to write data to a magnetic medium. The improved characteristics of the coil's current determines the response of the coil's magnetic field, which in turn, effects how the magnetic transitions are written to the medium.

BRIEF DESCRIPTION OF THE DRAWINGS

FIG. 1 illustrates the important current characteristics of a coil current for a write coil driver;

FIG. 2 is a schematic diagram of a conventional current source based write control driver;

FIG. 6 is a waveform diagram depicting the waveforms at node WDX, N1, and N2;

FIG. 7 is waveform diagram depicting the waveforms at node WDY, N3 and N4; and

DETAILED DESCRIPTION OF THE PREFERRED EMBODIMENT

Figure 3:
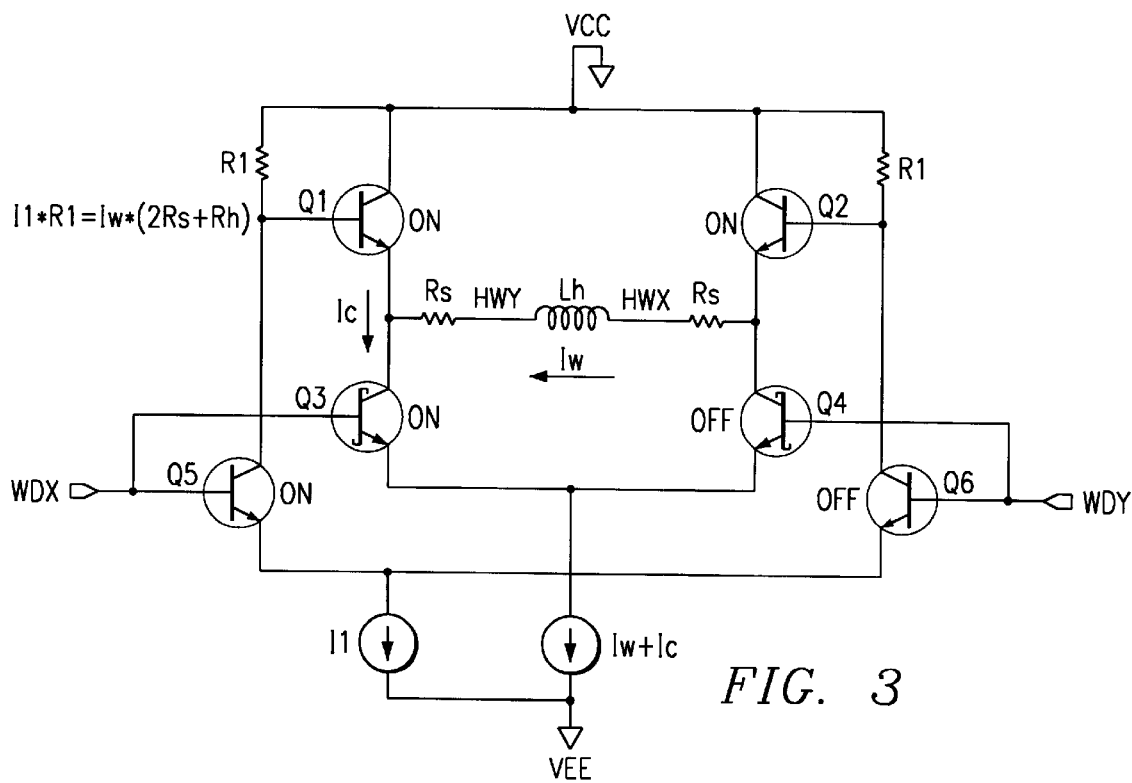
FIG. 3 is a schematic diagram of the present invention comprising a voltage source/impedance based write coil driver.

Referring now to FIG. 3, there is shown at 20 a voltage source/impedance based write coil driver according to the present invention. Notice that the four transistors $Q_1$, $Q_2$, $Q_3$, $Q_4$ are connected similar to the conventional H-bridge circuit of FIG. 2. However, these transistors are connected to the coil $L_H$ through a pair of series resistors $R_S$, one connected on each side of coil $L_H$. This is a simplified circuit and typically there is a transmission line connected between the coil, $L_H$, and the series resistors $R_S$.

Assume coil current $I_W$ is flowing from node HWX to node HWY. Transistor $Q_6$ will be off and transistor $Q_5$ will be on because the differential signal at node WDX is greater than at node WDY. The signals at node WDX and node WDY are the write data control signals. There is no current flowing through resistor $R_1$. Also, since transistors $Q_4$ and $Q_3$ are controlled by the voltage at nodes WDX and WDY, transistor $Q_4$ will be off and transistor $Q_3$ will be on.

The current through transistor $Q_3$ is $I_W+I_C$. This current is greater than the current through coil $I_W$, and therefore transistor $Q_1$ will be on and source the current $I_C$. Since both transistor $Q_1$ and transistor $Q_2$ are on, they will look like emitter followers. The emitter voltages will follow the base voltages at transistor $Q_1$ and transistor $Q_2$. The base voltage at transistor $Q_1$ is chosen to be:

$$I_1 \times R_1 = I_W \times (2 \times R_S + R_H)$$

where $R_H$ is the coil's DC resistance. The base voltages of transistor $Q_1$ and transistor $Q_2$ are both relative to supply voltage VCC and both transistor $Q_1$ and transistor $Q_2$ are on, therefore the voltage $I_1 \times R_1$ will be the differential voltage that appears across the coil $L_H$ and series resistors $R_S$.

The coil $L_H$ looks like it is being driven by a "voltage source" with a series resistance $2 \times R_S$. The impedance at the emitters of transistors $Q_1$ and transistors $Q_2$ is low because both transistors $Q_1$ and $Q_2$ are on. The voltage of the "voltage source" is equal to:

$$I_1 \times R_1$$

which is chosen to provide the correct coil current $I_W$ given the series resistors $R_S$ and DC coil resistance $R_H$.

This circuit 20 achieves technical advantages in that the common mode impedance seen at node HWX and node HWY is almost the same. The differential impedance is close to $2 \times R_S$. Moreover, the differential impedance is real, and therefore, can be chosen to match a transmission lines characteristic impedance. The conventional circuit's 10 impedance of FIG. 2 is complex because the current source side of the H-bridge is high impedance. Any capacitance from the parasitic H-bridge transistors or from the coil (traces) will distort the coil current waveform.

Figure 4:
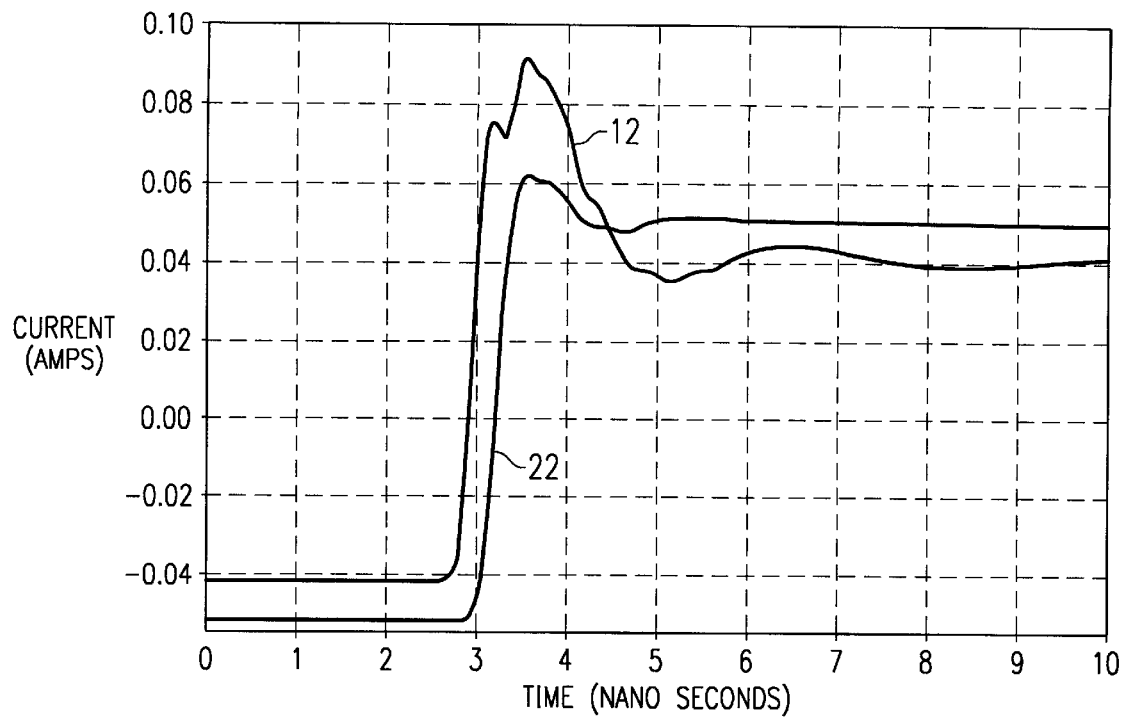
FIG. 4 is a graph illustrating the improvements of the current waveform of the coil driver of present invention versus the current waveform of the conventional driver of FIG. 2.

Referring now to FIG. 4 there is shown a comparison the current waveform 22 of the voltage source/impedance based coil driver 20 of the present invention of FIG. 3 versus the current waveform 12 of the more conventional coil driver 10 of FIG. 2.

Overshoot Control for Voltage Source/Impedance Based Write Coil Driver

Figure 5:
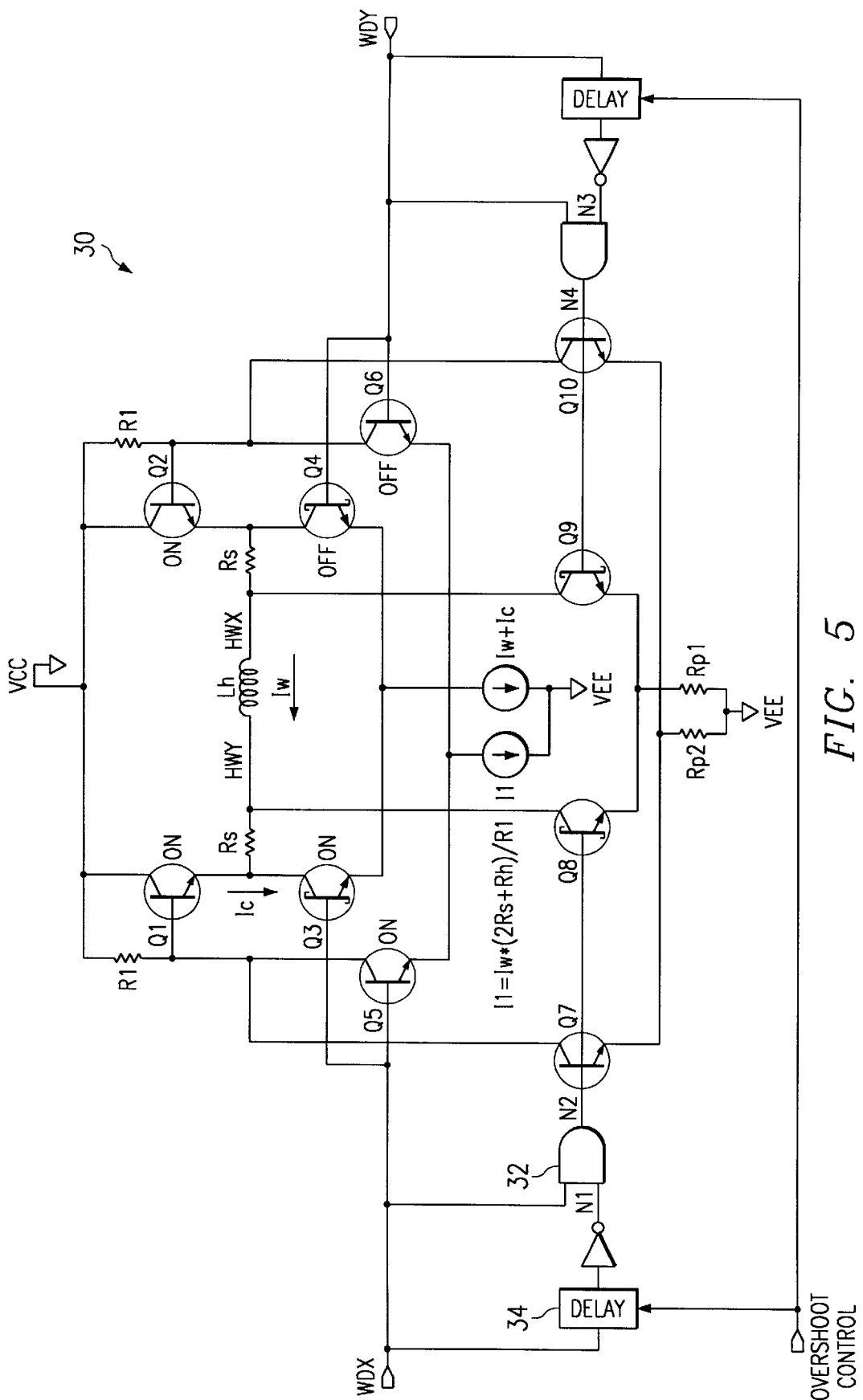
FIG. 5 is a schematic diagram of a second preferred embodiment of the present invention including an overshoot circuit for the write coil driver circuit of FIG. 3 incorporating a delay that responsibly controls the overshoot of the coil current.

Referring now to FIG. 5, there is shown an overshoot circuit at 30 according to a second preferred embodiment of the invention. As described, the coil current is proportional to $I_1 \times R_1$. Advantageously, an additional pulse current can be added to $I_1$. This pulse current creates a larger current through the coil, because as described above, the voltage developed across $I_1 \times R_1$ appears across $2R_S + R_H$. The coil current is the superposition of the steady state current derived from $I_1 \times R_1$ and a pulsed current derived from transistor $Q_7$ or transistor $Q_{10}$.

Assume that the pulsed current will come from the transistor $Q_7$ that is connected to resistor $R_1$. Notice that transistor $Q_7$ and transistor $Q_{10}$ are a differential pair. The differential pair switching is controlled by node voltages N2 and N4. The write data control signal, WDX (WDY is complementary to WDX as shown in FIG. 6 and FIG. 7), is sent to one input of a corresponding AND gate 32 and to a corresponding delay circuit 34. The output of the delay circuit 32 is inverted and sent to the other input of the AND gate 32. Examining the waveforms at node WDX and node N1 in FIG. 6, the result is voltage N2 at the output of the AND gate 32. Voltage N2 is actually a pulse signal that controls the switching of transistor $Q_7$. The pulse voltage at node N2 is used to control the pulsed current that flows through transistor $Q_7$ and through corresponding resistor $R_1$. The waveforms at node WDY and node N3 are shown in FIG. 7. FIG. 5 is a simplified schematic of the voltage N2 is a control signal that switches a voltage to the base of transistor $Q_7$. The base voltage of transistor $Q_7$ may be determined by another circuit (not shown).

There are two criteria that determine the amount of overshoot current through the coil: (1) the duration of the delay of circuit 32, and (2) the amount of voltage supplied to the base of transistor $Q_7$, which in turn, determines the amount of pulse current through $R_1$. For example, a larger base voltage at $Q_7$ will develop a larger voltage across resistor $R_F 2$, and therefore more current through transistor $Q_7$ and resistor $R_1$. The effect of the magnitude of the pulse current through transistor $Q_7$ is more obvious than the effect of the delay circuit 32.

The effect of the delay circuit 32 on pulse current will be dependent on how fast the voltage on corresponding resistor $R_1$ slews. If the delay is short, and the voltage across resistor $R_1$ slews slowly, then the pulse current from transistor $Q_7$ will not contribute much to the pulse current through the coil. In other words, imagine a large capacitor, C, connected to the base of transistor $Q_1$ and resistor $R_1$. The voltage developed at this node is $dV = (I \div C) \times dT$. In this example, I is the pulse current magnitude, and dT is the delay time. If dT is longer, then dV is larger and more voltage is developed across the resistor, $R_1$. If I is larger, then dV is larger and more voltage is developed across $R_1$.

Figure 8:
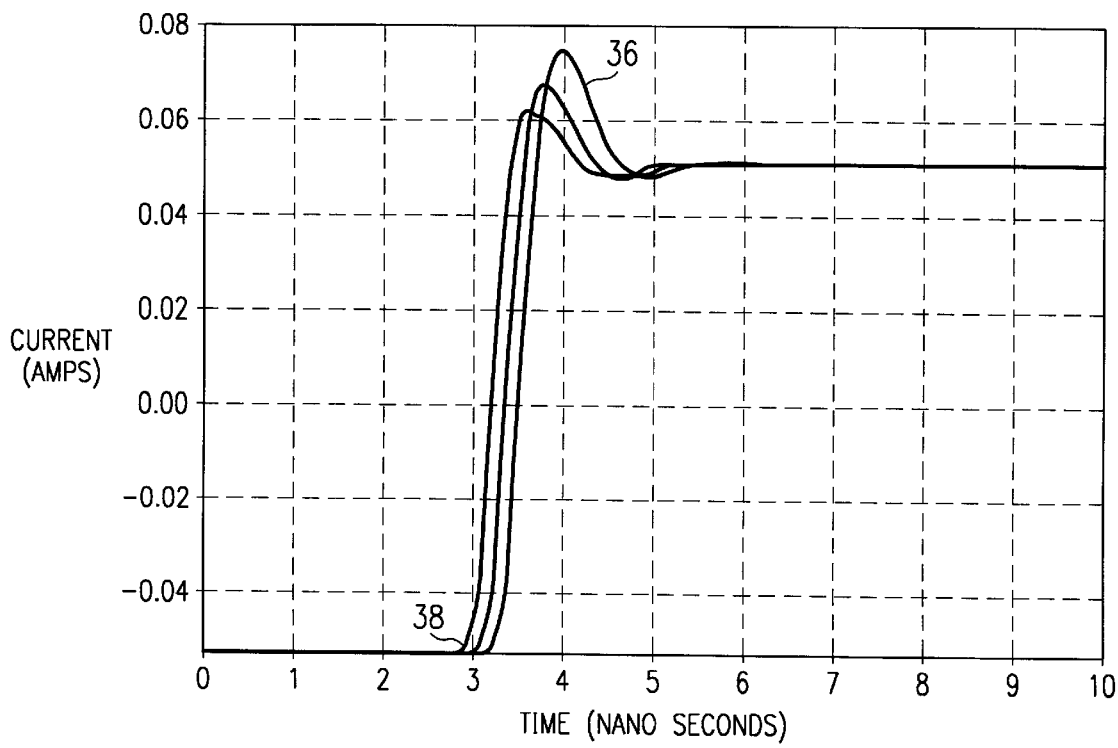
FIG. 8 is a waveform diagram illustrating the relationship between the time delay and the overshoot of the coil current for the embodiment of FIG. 5.

FIG. 8 shows the effect of the delay circuit on the coil current's overshoot. With more delay shown as waveform 36, the coil current overshoots more than the coil current associated with a shorter delay, corresponding to waveform 38.

There are many variations of this circuit. The delay circuit must be carefully designed to have compensation for voltage, temperature and process. The method of controlling the base voltage at $Q_7$ could be designed to correlate with the coil current magnitude to give an coil overshoot that has a constant percentage magnitude when the coil current changes.

We claim:

1. An overshoot control circuit for a write coil driver, comprising:
   an H-bridge drive circuit having a first and second transistor coupled together at a first node, and a third and fourth transistor coupled together at a second node;
   a coil;
   a first resistor coupled between said first node and one, end of said coil, and a second resistor coupled between said second node and the other end of said coil; and
   a drive circuit drivingly coupled to said to said first, second, third and fourth transistors and variably driving of said first transistor with respect to said second transistor, and variably driving said third transistor with respect to said fourth transistor,
   wherein said drive circuit provides a current pulse to said first transistor,
   wherein said current pulse is generated by delaying a predetermined time period a control signal, inverting said delayed control signal, and coupling said control signal and said inverted delayed control signal to a logic AND gate.

2. The overshoot control circuit as specified in claim 1 wherein said drive circuit comprises a third resistor coupled between a control gate of said first transistor and a positive voltage potential, said current pulse being provided to said first transistor gate.

3. The overshoot control circuit as specified in claim 2 further comprising a switch coupled between said first transistor gate and a negative voltage supply.

4. The overshoot control circuit as specified in claim 1 wherein said drive circuit comprises a first drive transistor drivingly coupled to said first transistor and a second drive transistor drivingly coupled to said third transistor.

5. The overshoot control circuit as specified in claim 4 wherein a first control terminal is coupled to said first drive transistor and said second transistor, and a second control terminal is coupled to said second drive transistor and said fourth transistor.

6. The overshoot control circuit as specified in claim 5 further comprising a differential control voltage being coupled to said first and second control terminals.

7. The overshoot control circuit as specified in claim 5 wherein said first drive transistor and said second drive transistor comprise a differential pair.

8. The overshoot control circuit as specified in claim 4 further comprising a fifth transistor coupled to a node defined between said first resistor and said coil, and a sixth transistor coupled to a node defined between said second resistor and said coil, said fifth transistor and said first drive transistor being commonly controlled, and said sixth transistor and said second drive transistor being commonly controlled.

9. The overshoot control circuit as specified in claim 8 wherein said fifth transistor and said sixth transistor are coupled to a negative voltage supply.

10. The overshoot control circuit as specified in claim 4 wherein said first drive transistor and said second drive transistors are coupled together and to a current source.

11. The overshoot control circuit as specified in claim 10 wherein said current source includes a current limiting resister.

12. The overshoot control circuit as specified in claim 1 wherein said first and second resistors have generally the same value.

13. The overshoot control circuit as specified in claim 1 wherein said second and said fourth transistors are coupled together and to a current source.

14. The overshoot control circuit as specified in claim 13 wherein said current source includes a current limiting resister.

15. The overshoot control circuit as specified in claim 1 wherein all said transistors are bipolar devices.

* * * * *